United States Patent [19]
Cheng

[11] Patent Number: 5,360,950
[45] Date of Patent: Nov. 1, 1994

[54] SET POINT POSTAL SCALE
[76] Inventor: Chung-Pu Cheng, Suite 1, 11F, 95-8 Chung Ping Road, Sec. 1, Taichung,
[21] Appl. No.: 884,416
[22] Filed: May 18, 1992
[51] Int. Cl.$^5$ ............................................. G01G 3/02
[52] U.S. Cl. ................................. 177/232; 177/263
[58] Field of Search ................................. 177/232, 233

[56] References Cited
U.S. PATENT DOCUMENTS

| | | | |
|---|---|---|---|
| 3,319,730 | 5/1967 | Cuddon-Fletcher | 177/232 |
| 3,583,505 | 6/1971 | Valkinburgh et al. | 177/232 |
| 3,718,198 | 2/1973 | Hach | 177/232 |

Primary Examiner—George H. Miller, Jr.

[57] ABSTRACT

A set point postal scale comprises in a first embodiment thereof a transparent tubular holder having a lower base, a weighing pan having a plunger depending therefrom, a compression spring disposed within the holder, and a set of annular rings. The plunger is slidingly engaged within the holder and is in abutment with the spring which resists downward displacements of the weighing pan. The differently colored rings are slid along the holder to selected positions thereon corresponding to given weights as determined by a set of calibration weights provided with the scale. In a second embodiment thereof, the holder is suspended by a hooked appendage on an upper portion thereof and the weighing pan is replaced by a angled tray depending from a lower end of the spring which now acts in tension within the transparent holder.

5 Claims, 6 Drawing Sheets

SET POINT POSTAL SCALE

BACKGROUND OF THE PRESENT INVENTION

The present invention relates to a spring operated weighing scale, and more particularly to a spring operated weighing scale having settable indicia for defining a range of weights which is particularly well suited for weighing postal articles.

Conventional forms of spring operated weighing scales, including those used to weigh postal articles, generally display a measured weight by means of a graduated weight scale referenced by a spring carried pointer. Thus, to ascertain the weight of an article, a user is required to view the referenced indicia on the scale and interpolate a reading from between the bracketing graduation marks thereon. He or she may then reference a look-up table and cross reference to a fee or other predetermined value for the weight range in which the reading falls. Though simple in principle, this procedure can easily lead to errors. Especially when a user is fatigued or exposed to the tedium of repetitive weighings, it is all to easy to misreference a weighing, either when done mentally or by looking-up a table. Furthermore, this conventional form of weighing scale generally does not provide a wide angle of view towards the weight scale thereon and as a result only a limited number of user's situated in relative proximity can use the scale concurrently. Another deficiency which is found in all spring operated scales is that the spring constant of the biasing element therein tends to change after a prolonged usage or as a result of changes in climate, leading to weighing inaccuracies with there generally being no simple means of recalibration.

In light of these and other deficiencies in the conventional type weighing scale, the set point weighing scale of the present invention was accomplished in order to provide a user with a scale which facilitates rapid readings of weight ranges with far less frequency of error and which enables panoramic viewing of the weight ranges irrespective of a user's position relative therewith.

SUMMARY OF THE PRESENT INVENTION

The present invention has as a main object to provide a spring operated postal scale comprising a transparent tubular holder carrying an internal spring element with an attached indicator, a weighing pan supported over the holder by a depending plunger engaged with the spring element therein, and a plurality of annular setting rings. Wherein, the setting rings selectively positioned at predetermined positions along the holder act in lieu of the graduated weight scale as found on more conventional spring scales so as to provide comparatively faster weight readings with less frequency of error.

A further object of the present invention is to provide a postal scale as characterized that enables panoramic viewing of the set point weight scale defined by the rings on the transparent holder so as to enable concurrent usage by a number of users situated around the scale.

A still further object of the present invention is to provide a postal scale further characterized in having a set of calibrating weights for adjustment of the setting rings so as to maintain the scales accuracy after prolonged usage or to change the settings to a new weight range.

Yet another object of the present invention is to provide a postal scale as characterized which has a minimal number of components so as to simplify manufacture and reduce costs.

A more thorough understanding of the attainment of these and further objects and advantages of the present invention will be garnered by reference to the detailed description of the preferred embodiments thereof provided below along with accompanying drawings.

DETAILED DESCRIPTION OF THE PREFERRED EMBODIMENTS

Figure 1:
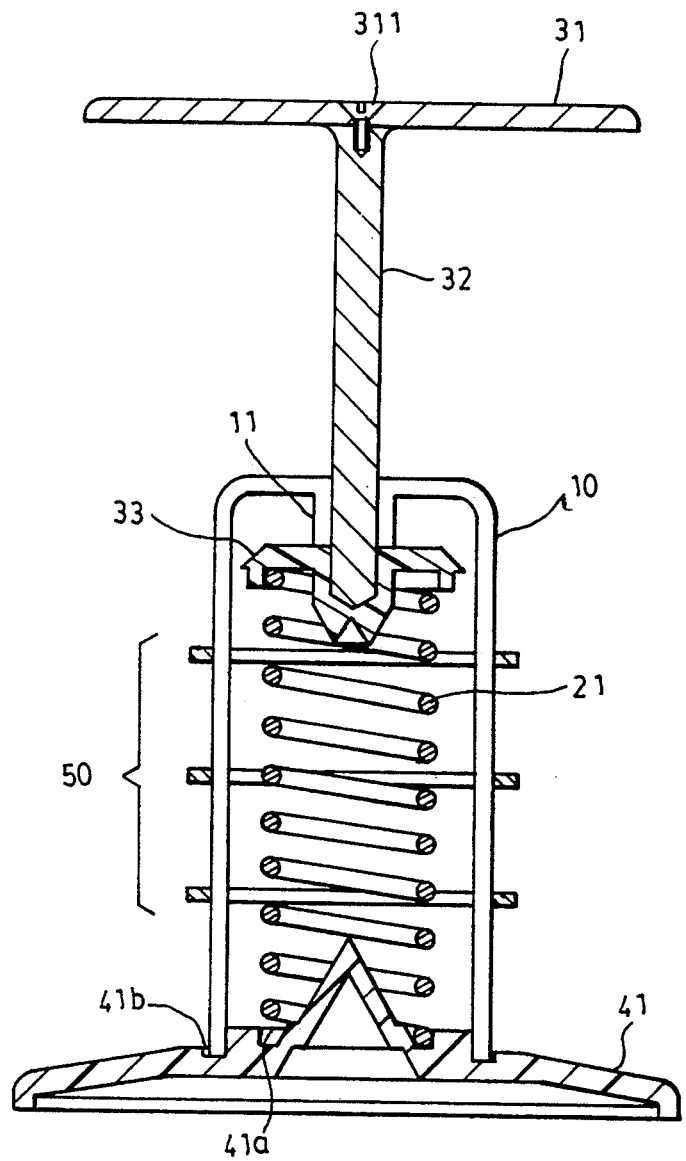
FIG. 1 is a sectional view of a first embodiment of the set point postal scale.

Referring to the drawings, a first embodiment of the set point postal scale of the present invention, as shown in FIG. 1 thereof, comprises a transparent tubular holder 10 containing a compression type coil spring 21, a weighing pan 31 with a depending plunger 32, an enlarged diameter base 41 secured to the open lower end of the holder, and a set of annular setting rings 50 which are slidingly mounted along the periphery of the holder. The base 41 has concentric annular grooves 41a and 41b formed thereon for receiving the lower end of coil spring 21 and holder 10 which is adhesively joined therwith. Plunger 32 is connected to the underside of pan 31 by a threaded fastener 311 and is slidingly retained within the holder through a low friction sleeve 11 on the closed upper end thereof. An indicator disk 33 is secured to the lower end of the plunger within the holder and is in abutment with the upper end of the compression spring 21. Each of the setting rings 50 is provided with a unique coloration and can be readily slid to a predetermined position along the holder while maintaining sufficient friction therewith to retain its position.

Figure 2:
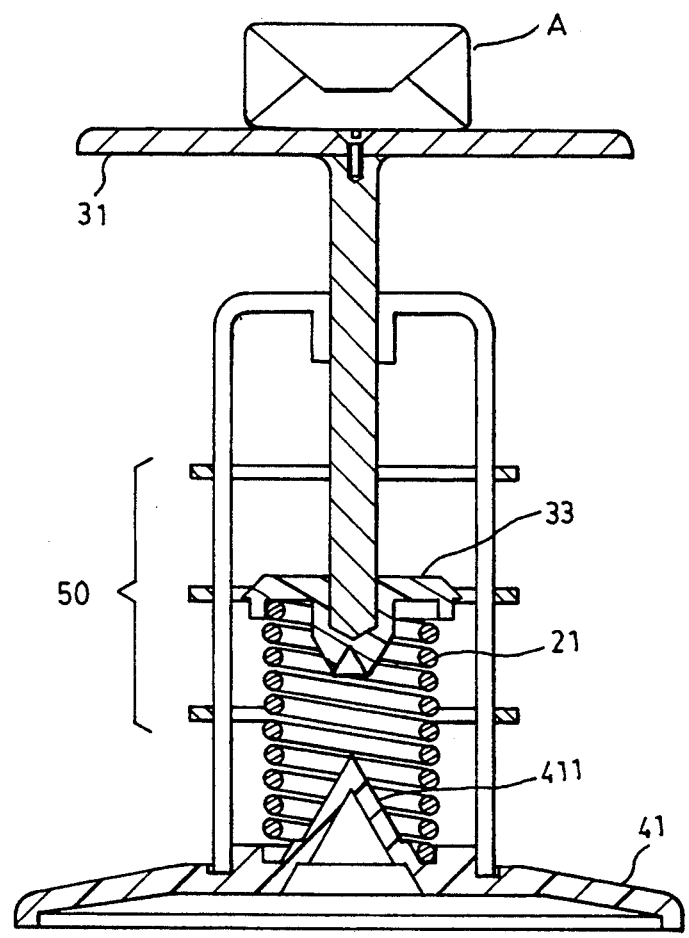
FIG. 2 is a sectional view of the postal scale of FIG. 1 weighing a parcel.

The position of each ring 50 on the holder corresponds with the position assumed by indicator disk 33 within the holder when a corresponding predetermined weight is placed on the weighing pan to cause the plunger and disk to descend therein against the bias of spring 21. Thus, in operation a user would determine to which weight range a parcel belonged by placing the parcel A to be weighed onto pan 31, as in FIG. 2, and viewing the indicator disk 33 within the transparent holder to note in which interval thereon, as defined by rings 50, it was positioned. Afterwhich, he or she could reference a list of postal fees or other values which are separated by colored dividers corresponding in coloration and order with those of the setting rings on the holder. Hence, there are no weight markings which need to be interpolated or numbers which have to be cross referenced, leading to simpler, faster, and more reliable readings that are further aided by the visual mnemonic of the color scheme. The base 41 is further provided with a central, protruding cone 411 for abutment with a bottom portion of the indicator disk so as to limit the maximum downward displacement of the plunger and protect spring 21 from excessive loading.

Figure 3:
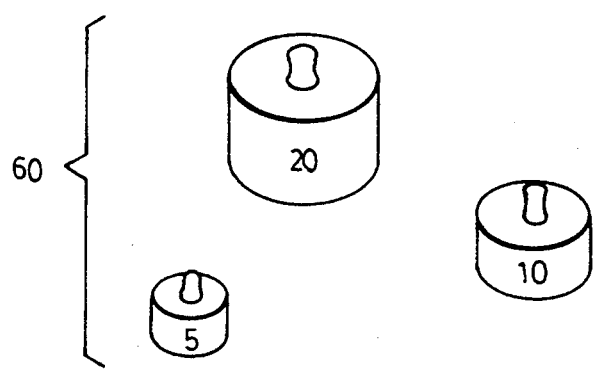
FIG. 3 is a perspective view showing a set of calibrating weights used with the set point postal scale.

FIG. 3 shows a set of weights 60, each having a predetermined mass as indicated by the markings thereon, which can be used to initially calibrate the postal scale of the present invention. The scale would first be calibrated for the maximum increment of weight in the desired weight ranges by placing the weights 60 on the weighing pan, either individually or in combination, so as to place an equivalent load on the scale. The lowermost ring 50 on the holder would then be slid into registry with the position of the beveled peripheral edge 331 of the indicater disk. The preceding weight increments are similarly calibrated for by repeating the above steps for each corresponding ring 50 on the holder. The calibration process can be repeated whenever a new weight range is to be defined using appropriate combinations of weights 60 to provide the equivalent loads for each increment. If necessary, re-calibration of the postal scale can also be performed to correct for changes in the spring constant of spring 21 due to ageing or other factors.

Figure 4:
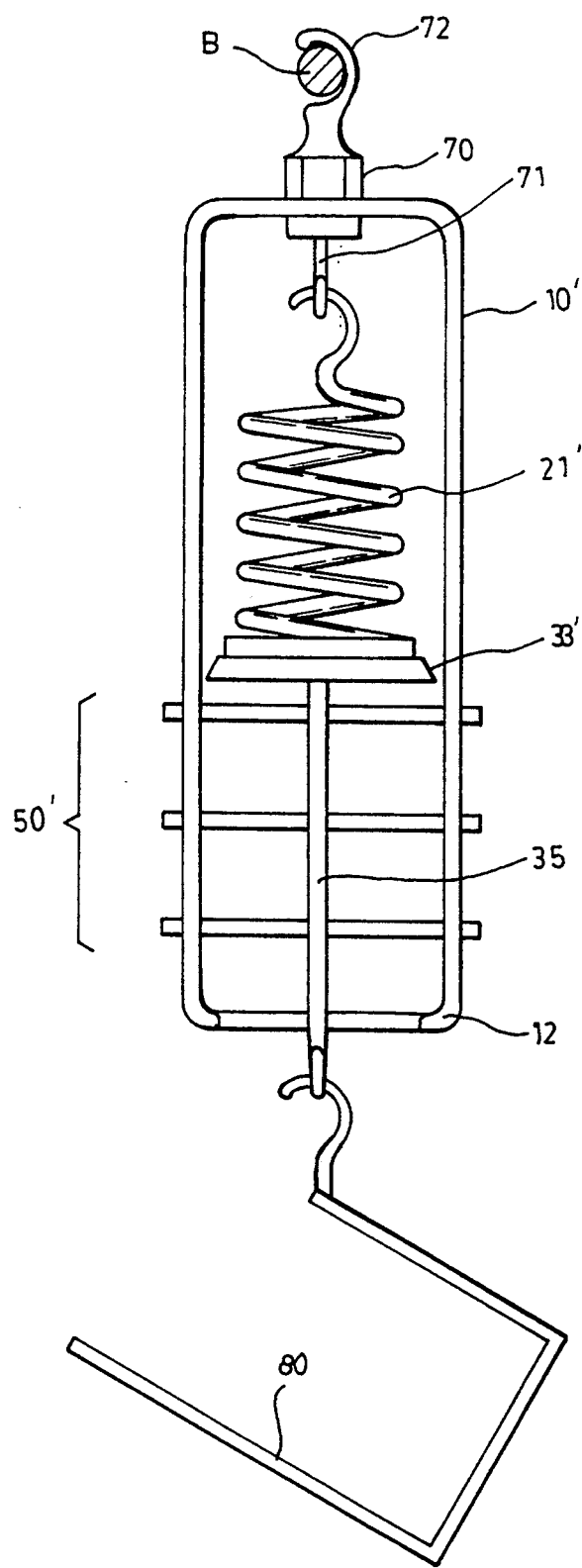
FIG. 4 is a sectional view of an alternate embodiment of the set point postal scale.

An alternate embodiment of the postal scale of the present invention, as shown in FIG. 4, can be hung from a vertical support for greater convenience. The transparent holder 10' therein has a closed upper end carrying an aligned support rod 70 and an open lower end with a reentrant rim 12. A hooked lower end 71 of the support rod is attached to the upper termination of spring 21' within the holder while a hooked upper end 72 thereof is attached to the vertical support B from which the holder depends. An indicater disk 33' is secured to the lower end of the spring 21' and has a depending extension rod 35 provided on the bottom thereof which extends below the rimmed opening 12 of the holder. Pan 80 defines an upwardly angled tray for receiving articles to be weighed and depends from the hooked lower end of rod 35. A set of setting rings 50' is also provided around the holder 10' with the function and calibration of the weight scale being similar with that of the prior embodiment, though spring 21' now acts in tension rather than in compression.

Figure 5:
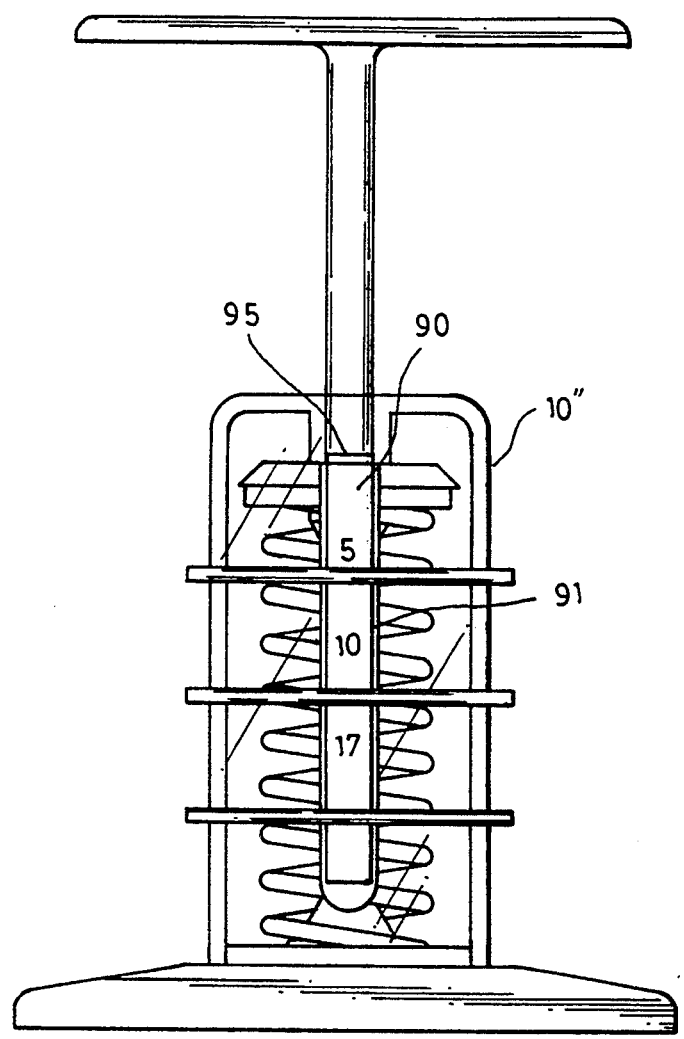
FIG. 5 is an elevational view of a set point postal scale having a removable postage fee indicia attached thereon.
Figure 5A:
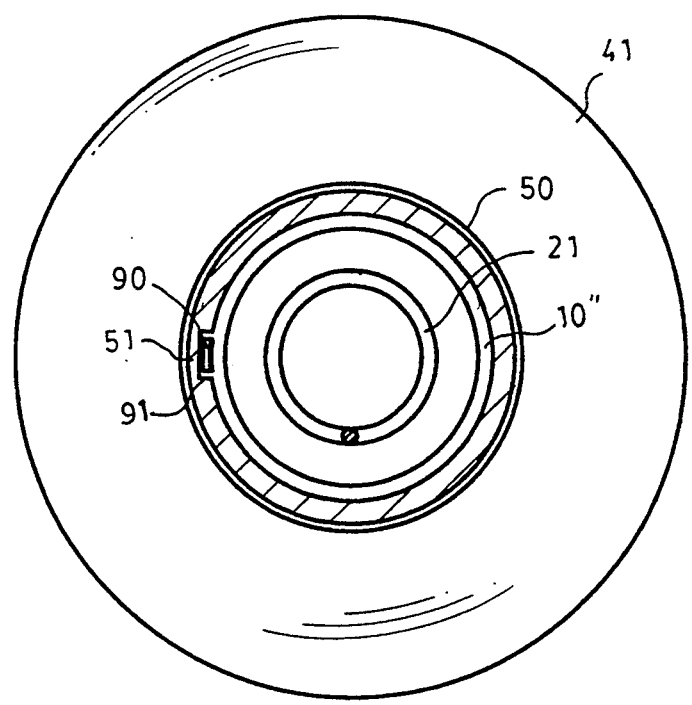
FIG. 5a is a sectional view of the set point postal scale of FIG. 5, taken along line A—A.

Many further variations and modifications to the postal scale of the present invention can also be made by a person of average skill in the related field without departing from the scope thereof. As one example, a vertical removable indicia can be positioned within the modified transparent holder of FIG. 5, wherein a longitudinal cavity 90 is formed along the periphery of holder 10" within a protruding groove 91 for receiving the paper indicia 95 therein. The groove 91 extends from the upper end of the holder where a small portion of the indicia protrudes for facilitating retrieval. Numerals written or printed thereon designate the corresponding values or fees for each weight range defined by the setting rings, with the numbers being positioned therebetween. A recessed slot 51 is formed on the inner periphery of each ring 50 for accomodating the groove 91, as shown in FIG. 5a. In this arrangement, there would be no need to reference a separate listing so as to further the convenience and usefullness of the weight scale.

The spirit and scope of the present invention should therefore not be construed to be limited by the exemplary embodiments described above, but instead should be determined from the appended claims and their legal equivalents.

I claim:

1. A set point weighing scale comprising a transparent generally tubular holder, a weighing pan, a plunger depending from said weighing pan and slidingly engaged within said holder, a spring element resisting the downward displacement of said plunger within said holder, a broadened base provided below said holder, and a plurality of annular rings slidingly positionable along said holder; the improvement wherein;

said spring element comprising a compression type coil spring and said plunger carrying an indicator disk on a lower portion thereof, said indicator being in abutment with an upper portion of said spring element.

2. A set point weighing scale as recited in claim 1, wherein said broadened base including a central protruding stop for abutment with a lower portion of said indicator disk so as to limit the maximum downward displacement of said plunger.

3. A set point weighing scale comprising a transparent generally tubular holder, a means for depending said holder from an external support, a spring element disposed within said holder having an upper end thereof attached to said support means, a weighing pan having an angled tray, said weighing pan being pivotably coupled to said spring element, and a plurality of annular rings slidingly positionable along said holder; the improvement wherein further comprising an indicator disk secured to the lower end of said spring element within said holder, said indicator disk being pivotably attached to said weighing pan.

4. A set point weighing scale as recited in claim 3, wherein said indicator disk and said weighing pan are attached by a hook type securement.

5. A set point weighing scale as recited in claim 4, wherein said transparent holder includes a reentrant rim provided around an open lower end thereof.

* * * * *